(12) United States Patent
Schnepper

(10) Patent No.: US 8,832,404 B2
(45) Date of Patent: *Sep. 9, 2014

(54) MEMORY HUB WITH INTEGRATED NON-VOLATILE MEMORY

(75) Inventor: Randy L. Schnepper, Rosemount, MN (US)

(73) Assignee: Round Rock Research, LLC, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,158

(22) Filed: Jul. 1, 2011

(65) Prior Publication Data

US 2011/0258403 A1 Oct. 20, 2011

Related U.S. Application Data

(63) Continuation of application No. 12/631,388, filed on Jan. 28, 2009, now Pat. No. 7,975,122, which is a continuation of application No. 11/417,751, filed on May 3, 2006, now Pat. No. 7,490,211, which is a continuation of application No. 10/665,904, filed on Sep. 18, 2003, now Pat. No. 7,194,593.

(51) Int. Cl.
*G06F 12/02* (2006.01)
*G06F 13/16* (2006.01)

(52) U.S. Cl.
CPC .................................. *G06F 13/1694* (2013.01)
USPC .......................................... 711/170; 711/103

(58) Field of Classification Search
None
See application file for complete search history.

(56) References Cited

U.S. PATENT DOCUMENTS

| | | | |
|---|---|---|---|
| 4,045,781 A | 8/1977 | Levy et al. |
| 4,240,143 A | 12/1980 | Besemer et al. |
| 4,245,306 A | 1/1981 | Besemer et al. |
| 4,253,144 A | 2/1981 | Bellamy et al. |
| 4,253,146 A | 2/1981 | Bellamy et al. |
| 4,608,702 A | 8/1986 | Hirzel et al. |
| 4,641,249 A | 2/1987 | Gion et al. |
| 4,707,823 A | 11/1987 | Holdren et al. |
| 4,724,520 A | 2/1988 | Athanas et al. |
| 4,891,808 A | 1/1990 | Williams |
| 4,930,128 A | 5/1990 | Suzuki et al. |
| 4,953,930 A | 9/1990 | Ramsey et al. |
| 4,989,113 A | 1/1991 | Asal |

(Continued)

FOREIGN PATENT DOCUMENTS

| EP | 0849685 A2 | 6/1998 |
|---|---|---|
| JP | 2001265539 A | 9/2001 |

(Continued)

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

(Continued)

*Primary Examiner* — Gary Portka
(74) *Attorney, Agent, or Firm* — Lerner, David, Littenberg, Krumholz & Mentlik, LLP

(57) ABSTRACT

A method for initializing a memory sub-system is provided. The method includes loading configuration registers of a plurality of memory hubs with the configuration information provided by a respective one of a plurality of embedded non-volatile memories integrated in the respective memory hub. The non-VOLATILE memory is accessed through a first configuration path from a memory controller of the memory sub-system to the non-VOLATILE memory.

14 Claims, 4 Drawing Sheets

(56) References Cited

U.S. PATENT DOCUMENTS

| | | |
|---|---|---|
| 5,241,506 A | 8/1993 | Motegi et al. |
| 5,243,703 A | 9/1993 | Farmwald et al. |
| 5,251,303 A | 10/1993 | Fogg, Jr. et al. |
| 5,269,022 A | 12/1993 | Shinjo et al. |
| 5,317,752 A | 5/1994 | Jewett et al. |
| 5,319,755 A | 6/1994 | Farmwald et al. |
| 5,327,553 A | 7/1994 | Jewett et al. |
| 5,355,391 A | 10/1994 | Horowitz et al. |
| 5,388,265 A | 2/1995 | Volk |
| 5,432,823 A | 7/1995 | Gasbarro et al. |
| 5,432,907 A | 7/1995 | Picazo, Jr. et al. |
| 5,442,770 A | 8/1995 | Barratt |
| 5,446,741 A | 8/1995 | Boldt et al. |
| 5,461,627 A | 10/1995 | Rypinski |
| 5,465,229 A | 11/1995 | Bechtolsheim et al. |
| 5,479,370 A | 12/1995 | Furuyama et al. |
| 5,497,476 A | 3/1996 | Oldfield et al. |
| 5,502,621 A | 3/1996 | Schumacher et al. |
| 5,544,319 A | 8/1996 | Acton et al. |
| 5,546,591 A | 8/1996 | Wurzburg et al. |
| 5,566,325 A | 10/1996 | Bruce, II et al. |
| 5,577,220 A | 11/1996 | Combs et al. |
| 5,581,767 A | 12/1996 | Katsuki et al. |
| 5,606,717 A | 2/1997 | Farmwald et al. |
| 5,621,883 A | 4/1997 | Thoulon et al. |
| 5,638,334 A | 6/1997 | Farmwald et al. |
| 5,644,784 A | 7/1997 | Peek |
| 5,659,798 A | 8/1997 | Blumrich et al. |
| 5,706,224 A | 1/1998 | Srinivasan et al. |
| 5,710,733 A | 1/1998 | Chengson et al. |
| 5,715,456 A | 2/1998 | Bennett et al. |
| 5,729,709 A | 3/1998 | Harness |
| 5,748,616 A | 5/1998 | Riley |
| 5,818,844 A | 10/1998 | Singh et al. |
| 5,819,304 A | 10/1998 | Nilsen et al. |
| 5,822,255 A | 10/1998 | Uchida |
| 5,832,250 A | 11/1998 | Whittaker |
| 5,875,352 A | 2/1999 | Gentry et al. |
| 5,875,454 A | 2/1999 | Craft et al. |
| 5,881,072 A | 3/1999 | Dell |
| 5,889,714 A | 3/1999 | Schumann et al. |
| 5,893,089 A | 4/1999 | Kikinis |
| 5,928,343 A | 7/1999 | Farmwald et al. |
| 5,944,800 A | 8/1999 | Mattheis et al. |
| 5,963,942 A | 10/1999 | Igata |
| 5,966,724 A | 10/1999 | Ryan |
| 5,973,935 A | 10/1999 | Schoenfeld et al. |
| 5,973,951 A | 10/1999 | Bechtolsheim et al. |
| 5,978,567 A | 11/1999 | Rebane et al. |
| 5,987,196 A | 11/1999 | Noble |
| 6,011,741 A | 1/2000 | Wallace et al. |
| 6,023,726 A | 2/2000 | Saksena |
| 6,023,738 A | 2/2000 | Priem et al. |
| 6,029,250 A | 2/2000 | Keeth |
| 6,031,241 A | 2/2000 | Silfvast et al. |
| 6,033,951 A | 3/2000 | Chao |
| 6,061,263 A | 5/2000 | Boaz et al. |
| 6,061,296 A | 5/2000 | Ternullo, Jr. et al. |
| 6,067,262 A | 5/2000 | Irrinki et al. |
| 6,073,190 A | 6/2000 | Rooney |
| 6,076,139 A | 6/2000 | Welker et al. |
| 6,079,008 A | 6/2000 | Clery, III |
| 6,098,158 A | 8/2000 | Lay et al. |
| 6,105,075 A | 8/2000 | Ghaffari |
| 6,118,719 A | 9/2000 | Dell et al. |
| 6,125,431 A | 9/2000 | Kobayashi |
| 6,131,149 A | 10/2000 | Lu et al. |
| 6,134,624 A | 10/2000 | Burns et al. |
| 6,137,709 A | 10/2000 | Boaz et al. |
| 6,144,587 A | 11/2000 | Yoshida |
| 6,167,465 A | 12/2000 | Parvin et al. |
| 6,167,486 A | 12/2000 | Lee et al. |
| 6,175,571 B1 | 1/2001 | Haddock et al. |
| 6,185,352 B1 | 2/2001 | Hurley |
| 6,186,400 B1 | 2/2001 | Dvorkis et al. |
| 6,191,663 B1 | 2/2001 | Hannah |
| 6,201,724 B1 | 3/2001 | Ishizaki et al. |
| 6,208,180 B1 | 3/2001 | Fisch et al. |
| 6,219,725 B1 | 4/2001 | Diehl et al. |
| 6,233,376 B1 | 5/2001 | Updegrove |
| 6,243,769 B1 | 6/2001 | Rooney |
| 6,243,831 B1 | 6/2001 | Mustafa et al. |
| 6,246,618 B1 | 6/2001 | Yamamoto et al. |
| 6,247,107 B1 | 6/2001 | Christie |
| 6,249,802 B1 | 6/2001 | Richardson et al. |
| 6,256,692 B1 | 7/2001 | Yoda et al. |
| 6,272,609 B1 | 8/2001 | Jeddeloh |
| 6,275,914 B1 | 8/2001 | Jeddeloh |
| 6,285,349 B1 | 9/2001 | Smith |
| 6,286,083 B1 | 9/2001 | Chin et al. |
| 6,294,937 B1 | 9/2001 | Crafts et al. |
| 6,301,637 B1 | 10/2001 | Krull et al. |
| 6,327,642 B1 | 12/2001 | Lee et al. |
| 6,330,205 B2 | 12/2001 | Shimizu et al. |
| 6,347,055 B1 | 2/2002 | Motomura |
| 6,349,363 B2 | 2/2002 | Cai et al. |
| 6,356,573 B1 | 3/2002 | Jonsson et al. |
| 6,367,074 B1 | 4/2002 | Bates et al. |
| 6,370,068 B2 | 4/2002 | Rhee |
| 6,370,601 B1 | 4/2002 | Baxter |
| 6,373,777 B1 | 4/2002 | Suzuki |
| 6,381,190 B1 | 4/2002 | Shinkai |
| 6,392,653 B1 | 5/2002 | Malandain et al. |
| 6,401,149 B1 | 6/2002 | Dennin et al. |
| 6,401,213 B1 | 6/2002 | Jeddeloh |
| 6,405,280 B1 | 6/2002 | Ryan |
| 6,421,744 B1 | 7/2002 | Morrison et al. |
| 6,430,696 B1 | 8/2002 | Keeth |
| 6,434,639 B1 | 8/2002 | Haghighi |
| 6,434,696 B1 | 8/2002 | Kang |
| 6,434,736 B1 | 8/2002 | Schaecher et al. |
| 6,438,622 B1 | 8/2002 | Haghighi et al. |
| 6,438,668 B1 | 8/2002 | Esfahani et al. |
| 6,449,308 B1 | 9/2002 | Knight, Jr. et al. |
| 6,453,393 B1 | 9/2002 | Holman et al. |
| 6,462,978 B2 | 10/2002 | Shibata et al. |
| 6,463,059 B1 | 10/2002 | Movshovich et al. |
| 6,470,422 B2 | 10/2002 | Cai et al. |
| 6,473,828 B1 | 10/2002 | Matsui |
| 6,477,592 B1 | 11/2002 | Chen et al. |
| 6,477,614 B1 | 11/2002 | Leddige et al. |
| 6,477,621 B1 | 11/2002 | Lee et al. |
| 6,479,322 B2 | 11/2002 | Kawata et al. |
| 6,490,188 B2 | 12/2002 | Nuxoll et al. |
| 6,493,803 B1 | 12/2002 | Pham et al. |
| 6,496,909 B1 | 12/2002 | Schimmel |
| 6,501,471 B1 | 12/2002 | Venkataraman et al. |
| 6,505,287 B2 | 1/2003 | Uematsu |
| 6,523,092 B1 | 2/2003 | Fanning |
| 6,523,093 B1 | 2/2003 | Bogin et al. |
| 6,539,490 B1 | 3/2003 | Forbes et al. |
| 6,552,564 B1 | 4/2003 | Forbes et al. |
| 6,553,479 B2 | 4/2003 | Mirsky et al. |
| 6,564,329 B1 | 5/2003 | Cheung et al. |
| 6,587,912 B2 | 7/2003 | Leddige et al. |
| 6,590,816 B2 | 7/2003 | Perner |
| 6,594,713 B1 | 7/2003 | Fuoco et al. |
| 6,594,722 B1 | 7/2003 | Willke, II et al. |
| 6,598,154 B1 | 7/2003 | Vaid et al. |
| 6,615,325 B2 | 9/2003 | Mailloux et al. |
| 6,622,227 B2 | 9/2003 | Zumkehr et al. |
| 6,628,294 B1 | 9/2003 | Sadowsky et al. |
| 6,629,220 B1 | 9/2003 | Dyer |
| 6,631,440 B2 | 10/2003 | Jenne et al. |
| 6,636,110 B1 | 10/2003 | Ooishi et al. |
| 6,646,929 B1 | 11/2003 | Moss et al. |
| 6,658,509 B1 | 12/2003 | Bonella et al. |
| 6,662,304 B2 | 12/2003 | Keeth et al. |
| 6,665,202 B2 | 12/2003 | Lindahl et al. |
| 6,667,895 B2 | 12/2003 | Jang et al. |
| 6,681,292 B2 | 1/2004 | Creta et al. |
| 6,697,926 B2 | 2/2004 | Johnson et al. |
| 6,715,018 B2 | 3/2004 | Farnworth et al. |
| 6,718,440 B2 | 4/2004 | Maiyuran et al. |

(56) References Cited

U.S. PATENT DOCUMENTS

| | | |
|---|---|---|
| 6,721,195 B2 | 4/2004 | Brunelle et al. |
| 6,724,685 B2 | 4/2004 | Braun et al. |
| 6,725,349 B2 | 4/2004 | Langendorf et al. |
| 6,728,800 B1 | 4/2004 | Lee et al. |
| 6,735,679 B1 | 5/2004 | Herbst et al. |
| 6,735,682 B2 | 5/2004 | Segelken et al. |
| 6,745,275 B2 | 6/2004 | Chang |
| 6,751,703 B2 | 6/2004 | Chilton |
| 6,754,812 B1 | 6/2004 | Abdallah et al. |
| 6,756,661 B2 | 6/2004 | Tsuneda et al. |
| 6,760,833 B1 | 7/2004 | Dowling |
| 6,771,538 B2 | 8/2004 | Shukuri et al. |
| 6,775,747 B2 | 8/2004 | Venkatraman |
| 6,782,465 B1 | 8/2004 | Schmidt |
| 6,785,780 B1 | 8/2004 | Klein et al. |
| 6,789,173 B1 | 9/2004 | Tanaka et al. |
| 6,792,059 B2 | 9/2004 | Yuan et al. |
| 6,792,496 B2 | 9/2004 | Aboulenein et al. |
| 6,795,899 B2 | 9/2004 | Dodd et al. |
| 6,799,246 B1 | 9/2004 | Wise et al. |
| 6,799,268 B1 | 9/2004 | Boggs et al. |
| 6,804,760 B2 | 10/2004 | Wiliams |
| 6,804,764 B2 | 10/2004 | LaBerge et al. |
| 6,807,630 B2 | 10/2004 | Lay et al. |
| 6,811,320 B1 | 11/2004 | Abbott |
| 6,816,947 B1 | 11/2004 | Huffman |
| 6,820,181 B2 | 11/2004 | Jeddeloh et al. |
| 6,821,029 B1 | 11/2004 | Grung et al. |
| 6,823,023 B1 | 11/2004 | Hannah |
| 6,845,409 B1 | 1/2005 | Talagala et al. |
| 6,859,856 B2 | 2/2005 | Piau et al. |
| 6,889,304 B2 | 5/2005 | Perego et al. |
| 6,910,109 B2 | 6/2005 | Holman et al. |
| 6,947,050 B2 | 9/2005 | Jeddeloh |
| 6,952,745 B1 | 10/2005 | Dodd et al. |
| 6,970,968 B1 | 11/2005 | Holman |
| 7,007,130 B1 | 2/2006 | Holman |
| 2001/0039612 A1 | 11/2001 | Lee |
| 2002/0033276 A1 | 3/2002 | Dabral et al. |
| 2002/0112119 A1 | 8/2002 | Halbert et al. |
| 2002/0116588 A1 | 8/2002 | Beckert et al. |
| 2002/0144027 A1 | 10/2002 | Schmisseur |
| 2002/0144064 A1 | 10/2002 | Fanning |
| 2003/0005223 A1 | 1/2003 | Coulson et al. |
| 2003/0023840 A1 | 1/2003 | Zitlaw et al. |
| 2003/0043158 A1 | 3/2003 | Wasserman et al. |
| 2003/0043426 A1 | 3/2003 | Baker et al. |
| 2003/0065836 A1 | 4/2003 | Pecone |
| 2003/0093630 A1 | 5/2003 | Richard et al. |
| 2003/0095559 A1 | 5/2003 | Sano et al. |
| 2003/0149809 A1 | 8/2003 | Jensen et al. |
| 2003/0163649 A1 | 8/2003 | Kapur et al. |
| 2003/0177320 A1 | 9/2003 | Sah et al. |
| 2003/0193927 A1 | 10/2003 | Hronik |
| 2003/0217223 A1 | 11/2003 | Nino et al. |
| 2003/0227798 A1 | 12/2003 | Pax |
| 2003/0229770 A1 | 12/2003 | Jeddeloh |
| 2003/0235099 A1 | 12/2003 | Mori et al. |
| 2004/0008545 A1 | 1/2004 | Korotkov et al. |
| 2004/0022094 A1 | 2/2004 | Radhakrishnan et al. |
| 2004/0024959 A1 | 2/2004 | Taylor |
| 2004/0044833 A1 | 3/2004 | Ryan |
| 2004/0047169 A1 | 3/2004 | Lee et al. |
| 2004/0126115 A1 | 7/2004 | Levy et al. |
| 2004/0144994 A1 | 7/2004 | Lee et al. |
| 2004/0199730 A1 | 10/2004 | Eggers et al. |
| 2004/0216018 A1 | 10/2004 | Cheung |
| 2004/0236885 A1 | 11/2004 | Fredriksson et al. |
| 2004/0243769 A1 | 12/2004 | Frame et al. |
| 2004/0260957 A1 | 12/2004 | Jeddeloh et al. |
| 2005/0021884 A1 | 1/2005 | Jeddeloh |
| 2005/0033874 A1 | 2/2005 | Futral et al. |
| 2005/0044327 A1 | 2/2005 | Howard et al. |
| 2005/0050237 A1 | 3/2005 | Jeddeloh |
| 2005/0071542 A1 | 3/2005 | Weber et al. |
| 2005/0146943 A1 | 7/2005 | Jeddeloh |
| 2005/0146944 A1 | 7/2005 | Jeddeloh |
| 2005/0160201 A1 | 7/2005 | Jeddeloh |
| 2005/0177755 A1 | 8/2005 | Fung |

FOREIGN PATENT DOCUMENTS

| | | |
|---|---|---|
| WO | 9319422 A1 | 9/1993 |
| WO | 98/57489 A2 | 12/1998 |
| WO | 0227499 A2 | 4/2002 |

OTHER PUBLICATIONS

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Jones, R. "Throughput Expansion with FET Based Crossbar Switching", Pericom, Application Note 45, Nov. 12, 2001, pp. 1-5.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

MEMORY HUB WITH INTEGRATED NON-VOLATILE MEMORY

CROSS-REFERENCE TO RELATED APPLICATIONS

This application is a continuation of U.S. patent application Ser. No. 12/361,388, which was filed on Jan. 28, 2009 which is scheduled to issue as U.S. Pat. No. 7,975,122 on Jul. 5, 2011, which is a continuation of U.S. patent application Ser. No. 11/417,751 which was filed on May 3, 2006, and issued as U.S. Pat. No. 7,490,211 on Feb. 10, 2009 which is a continuation of U.S. patent application Ser. No. 10/665,904 which was filed on Sep. 18, 2003 and issued as U.S. Pat. No. 7,194,593 on Mar. 20, 2007, the disclosures of which are incorporated herein by reference.

TECHNICAL FIELD

The present invention relates to memory systems, and more particularly, to memory modules having a memory hub and an integrated non-volatile memory for storing module specific information.

BACKGROUND OF THE INVENTION

Conventional computer systems include system memory, which is typically used to store information, such as instructions of a software application to be executed by a processor, as well as data that that is processed by the processor. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Generally, the system memory of a computer system takes the form of one or more memory modules that includes several integrated circuit memory devices mounted on a printed circuit board. Examples of the types of memory devices include asynchronous dynamic random access memories ("DRAMs") and synchronous DRAMs ("SDRAMs"). Typically, the memory modules are removably plugged into connectors located on a motherboard of the computer system. The size of the computer system's memory can be increased by plugging additional memory modules into the motherboard. Memory modules are commercially available in standardized configurations, such as a single in-line memory module ("SIMM") and a double in-line memory module ("DIMM"), which match the connectors. The memory modules are electrically coupled to the memory controller, processor, and other devices also mounted on the mother-board using standardized memory interfaces, as well known. These standardized memory interfaces generally include a data bus, an address bus, and a control/status bus.

Often included on the printed circuit board of a memory module is a non-volatile memory in which module specific information, such as timing information, memory type, and manufacturing information, is stored. The non-volatile memory of each module can be coupled to the memory controller on the mother board through a serial bus and the connector in which the memory module is inserted. The module specific information stored in the non-volatile memory is accessed by the computer system at start-up to initialize the memory controller so that it can communicate with the memory devices of the memory module. Additionally, the basic input/output system (BIOS) or operating system of the computer system may further access the module specific information through the serial bus in performing various tasks.

A memory system that has been developed as an approach to increasing system memory bandwidth employs multiple memory devices coupled to the processor through a "memory hub." In a memory hub architecture, or a hub-based memory sub-system, a system controller or memory controller is coupled over a high speed data link to several memory modules. Typically, the memory modules are coupled in a point-to-point or daisy chain architecture such that the memory modules are connected one to another in series. Each memory module includes a memory hub that is coupled to the corresponding high speed data links and a number of memory devices on the module, with the memory hubs efficiently routing memory requests and responses between the controller and the memory devices over the high speed data links.

A non-volatile memory is still included on the memory module for providing module specific information to the system controller of the host computer system, in the same manner as the memory module for the standard system memory configuration previously discussed. That is, the system controller is coupled through a serial bus and module connector to the non-volatile memory in order to read the module specific information as part of initializing the computer system. With the addition of a memory hub to the memory module, a printed circuit board having more space is required. However, in some applications, such as in hand-held computing devices or portable computers, space allocated to memory modules is at a premium, and consequently, increasing the size of the printed circuit board to accommodate the additional components is undesirable. Additionally, the time for completing initialization of the computer system upon power up will be limited by the speed at which the non-volatile memory of each of the memory modules in a system memory can be accessed and the information transferred to the system controller over the serial bus. In applications where the demand for processing capability is immediate, minimizing the time for initializing the computer system is desirable.

SUMMARY OF THE INVENTION

In one aspect of the present invention, a memory hub having an integrated non-volatile memory for storing configuration information is provided. The configuration information can be copied directly from the non-volatile memory into storage registers in the memory hub. The memory hub for a hub-based memory sub-system includes a high-speed interface for receiving memory access requests, a non-volatile memory having memory configuration information stored therein, and a memory controller coupled to the high-speed interface and the non-volatile memory. The memory controller includes registers into which the memory configuration information is loaded and is operable to output memory requests in response to receiving memory access requests from the high-speed interface and in accordance with the memory configuration information loaded in the registers. In another aspect of the present invention, a method for initializing a memory sub-system is provided. The method includes loading configuration registers of a plurality of memory hubs with the configuration information provided by a respective one of a plurality of embedded non-volatile memories integrated in the respective memory hub.

DETAILED DESCRIPTION OF THE INVENTION

Embodiments of the present invention are directed to a memory hub coupled to a non-volatile memory for access to information that can be copied directly from the non-volatile memory into storage registers in the memory hub. In embodiments having the non-volatile memory integrated with the memory hub, initialization time when powering on a host system can be reduced since the module specific information can be copied directly to configuration registers in the memory hub. Moreover, having the module specific information copied directly to the configuration registers in the memory hub allows for a host system to interface with the system memory without the need to accommodate any specific characteristics of the system memory, thus, providing a more controlled environment to which the host system may interface. Certain details are set forth below to provide a sufficient understanding of various embodiments of the invention. However, it will be clear to one skilled in the art that the invention may be practiced without these particular details. In other instances, well-known circuits, control signals, and timing protocols have not been shown in detail in order to avoid unnecessarily obscuring the invention.

Figure 1:
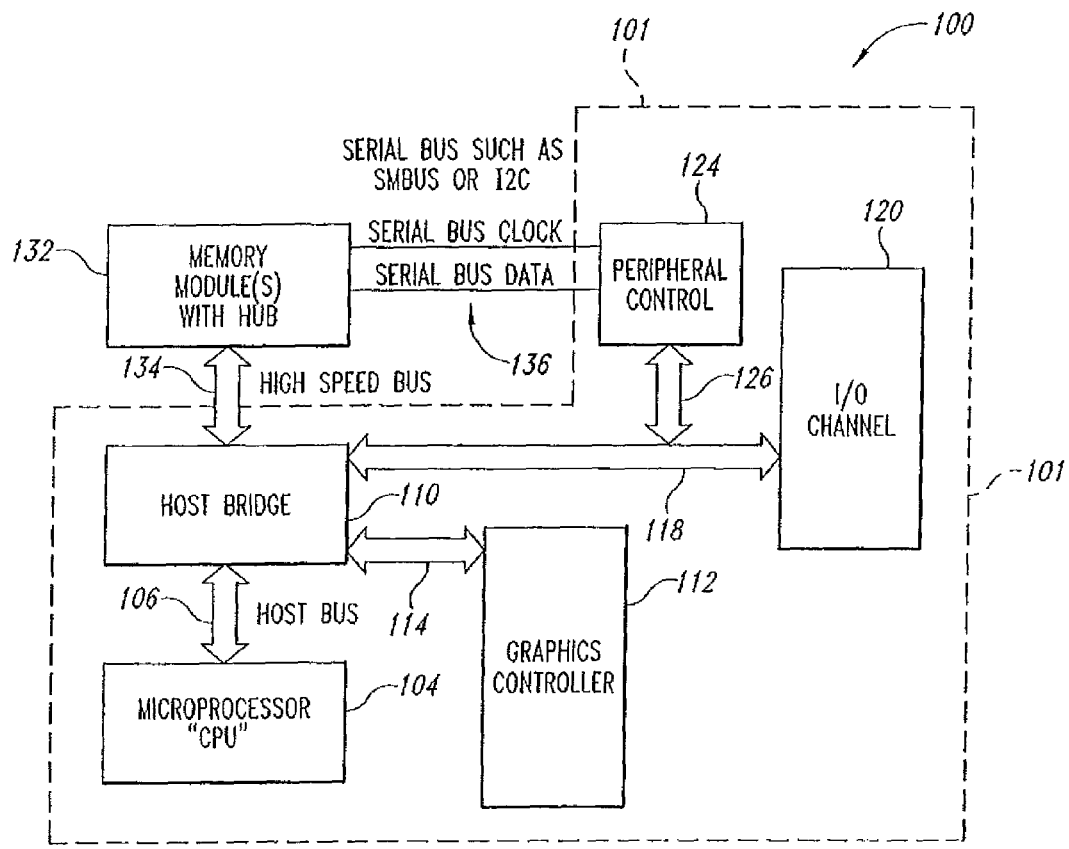
FIG. 1 is a partial block diagram of a computer system in which embodiments of the present invention can be implemented.

FIG. 1 illustrates a computer system 100 according to one embodiment of the present invention. The computer system 100 includes a processor 104 for performing various computing functions, such as executing specific software to perform specific calculations or tasks. The processor 104 includes a processor bus 106 that normally includes an address bus, a control bus, and a data bus. A host bridge 110 is also coupled to the processor bus 106. The host bridge 110 is also coupled through an input/output (I/O) bus 118 to an I/O channel 120 through which one or more input and output devices can be coupled. Examples of the I/O bus 118 would be the PCI or ISA bus standards. Some common devices that would be coupled to the I/O channel 120 would be network interface cards, modems or bus adapter cards for SCSI or Fibre Channel device support. A peripheral control 124 is coupled to the I/O bus 118. Examples of peripheral control 124 devices in personal computer chipsets would be the south bridge or the I/O controller hub. The peripheral control 124 block would generally support many of the standard I/O interface functions in the system (which are not shown in the diagram) such as keyboard and mouse, which allow an operator to interface with the computer system 100. Plus common output devices such as a printer, coupled to the processor 104 to store data or retrieve data from internal or external storage media (not shown). Examples of typical storage devices include hard and floppy disks, tape cassettes, and compact disk read-only memories (CD-ROMs). Peripheral control 124 would also typically be the controller or bus master for a relatively slow serial bus such as Inter-IC (I2C) or System Management Bus (SMBus) that is used by the system for housekeeping tasks such as capabilities reporting, configuration and health monitoring. The previously described components generally define a host system 101. The elements of the host system 101 are conventional, and can be implemented using designs and circuitry known by those ordinarily skilled in the art.

A system memory 132 is coupled to the host system 101, more specifically, the host bridge 110, through a high-speed bus 134. The system memory 132 is represented in FIG. 1 by a memory hub based memory system that includes one or more memory modules, each of which includes a memory hub (not shown). As will be explained in more detail below, a memory hub controls access to memory devices of the memory module on which the memory hub is located. The high-speed bus 134 can be a bi-directional bus that couples together the memory hubs of the memory modules in various configurations. For example, the high-speed bus 134 can couple the memory modules together in a point-to-point configuration where information on the high-speed bus 134 must travel through the memory hubs of "upstream" memory modules to reach a "downstream" destination. It will be appreciated, however, that a high-speed link 134 providing topologies other than the point-to-point arrangement may also be used. For example, a high-speed link 134 providing a coupling arrangement in which a separate high-speed bus (not shown) is used to couple each of the memory modules of the system memory 132 to the host bridge 110 may also be used. A switching topology may also be used in which the host bridge 110 is selectively coupled to each of memory module of the system memory 132 through a switch (not shown). Other topologies that may be used will be apparent to one skilled in the art.

Additionally, the high-speed link 134 coupling the memory modules to the memory hub controller may be an electrical or optical communication path. However, other types of communications paths can be used for the high-speed link 134 as well. In the event the high-speed link 134 is implemented as an optical communication path, the optical communication path may be in the form of one or more optical fibers. In such case, the host bridge 110 and the memory modules of the system memory 132 will include an optical input/output port or separate input and output ports coupled to the optical communication path, as well known in the art.

The system memory 132 is also coupled to the peripheral control 124 through system serial busses 136. As shown in FIG. 1, the system memory 132 is coupled to the peripheral control 124 through a serial bus clock line and a serial bus data line, such as an Inter-IC (I2C) bus or a System Management Bus (SMBus), which are well known in the art. As will be explained in greater detail below, the system serial busses 136 can be used by the host system to access information from the system memory 132, such as system memory configuration information, as well known in the art.

Figure 2:
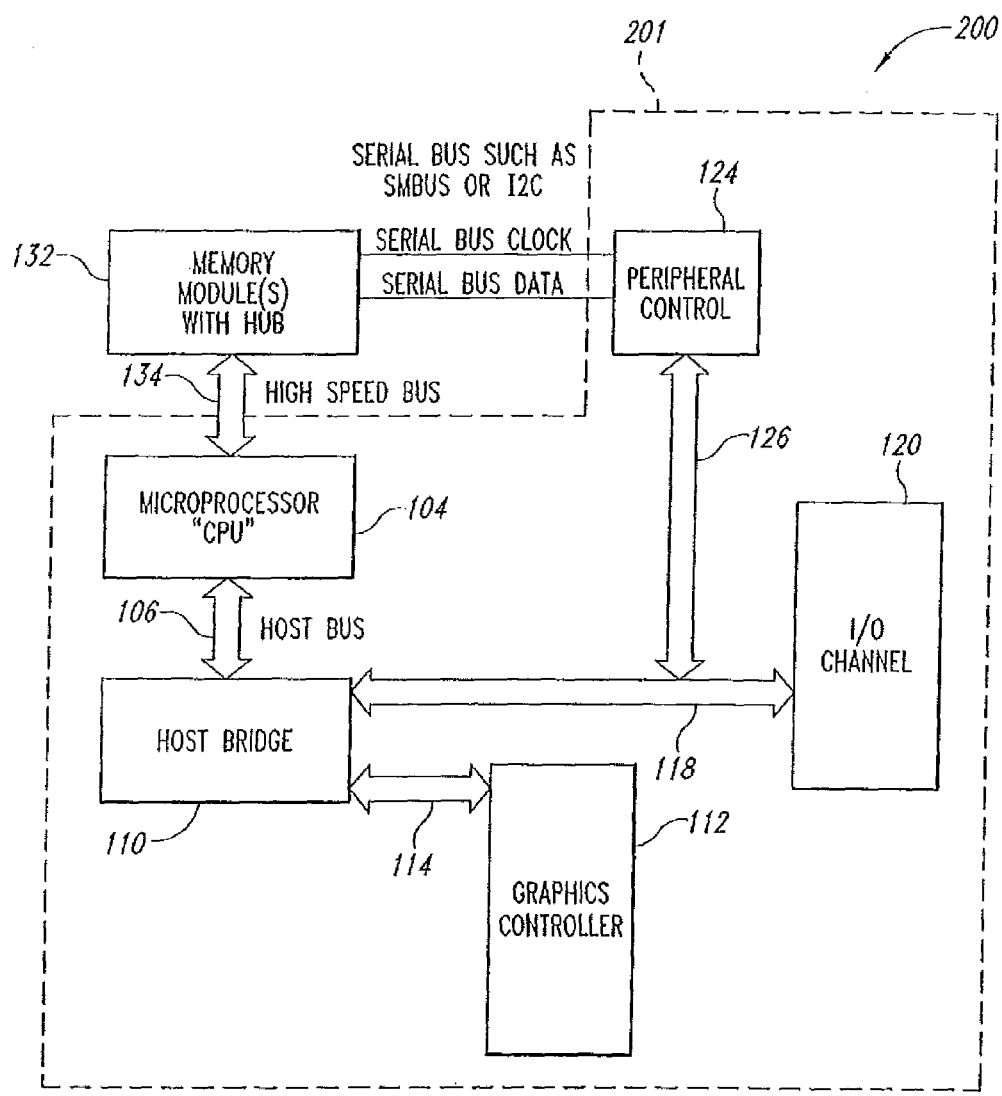
FIG. 2 is a partial block diagram of an alternative computer system in which embodiments of the present invention can also be implemented.

FIG. 2 illustrates a computer system 200 according to another embodiment of the present invention. The computer system 200 includes a host system 201 that includes the same components as the host system 101 (FIG. 1). Consequently, each of the components will not be described again in detail in the interest of brevity. However, in the computer system 200, the system memory 132 is coupled to the processor 104 through the high-speed bus 134. In contrast, in the computer system 100, the system memory 132 is coupled to the host bridge 110 through the high-speed bus 134. The architecture of the computer system 200 may be preferable where immediate access to the system memory 132 by the processor is desirable, such as for computer systems designed for data intensive processing applications.

Figure 3:
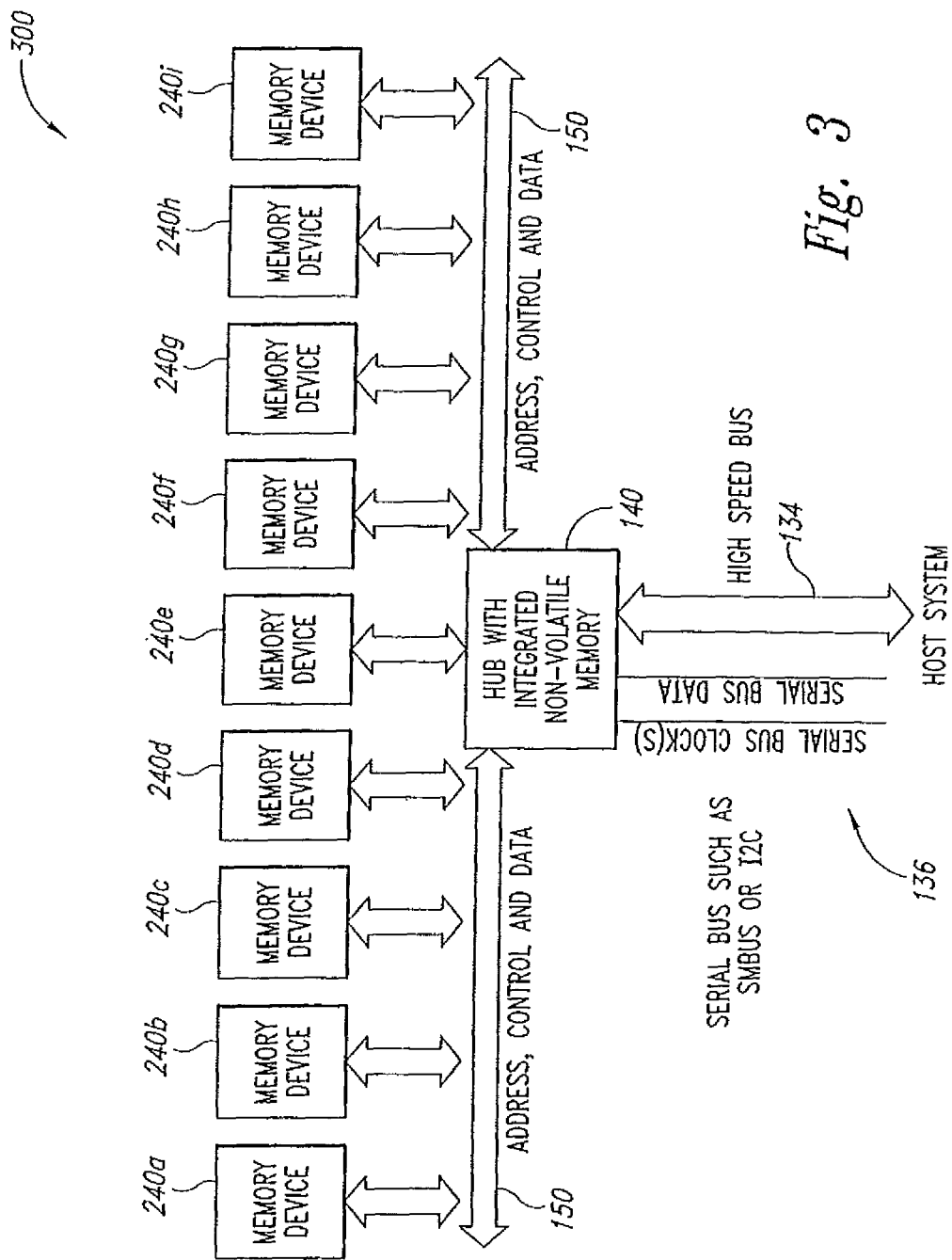
FIG. 3 is a partial block diagram of a memory module according to an embodiment of the present invention that may be used in the computer system of FIG. 1 or 2.

FIG. 3 shows a partial block diagram of a memory module 300 according to an embodiment of the present invention. The memory module 300 can be used in the system memory 132 (FIG. 1). The memory module 300 includes a memory hub 140 coupled to several memory devices 240a-240i through a memory device bus system 150. The memory device bus system 150 normally includes a control bus, an address bus, and a data bus, as known in the art. However, it will be appreciated by those ordinarily skilled in the art that other memory device bus systems, such as a bus system using a shared command/address bus, may also be used without departing from the scope of the present invention. In FIG. 3, the memory devices 240a-240i are illustrated as synchronous dynamic random access memory ("SDRAM") devices. However, memory devices other than SDRAM devices may also be used. It will be further appreciated that the arrangement of the memory devices 240a-240i, and the number of memory devices can be modified without departing from the scope of the present invention.

As previously mentioned, the memory hub 140 controls access to memory devices 240a-240i of the memory module 300. Thus, memory requests and responses between the host system and the memory devices 240a-240i can be efficiently routed by the memory hub 140 over the high-speed bus 134. It will be appreciated that the system memory 132 will typically include multiple memory modules, each having its own memory hub 140, which are coupled together by the high-speed bus 134. Computer systems employing this architecture can have a higher bandwidth because a host system can leverage the memory hubs 140 of the system memory 132 to access a memory device on one memory module while a memory device on another memory module is responding to a prior memory access. For example, the host system can output write data to one of the memory devices in the system memory 132 while another memory device in the system memory 132 is preparing to provide read data to the processor. Moreover, this architecture also provides for easy expansion of the system memory without concern for degradation in signal quality as more memory modules are added.

Figure 4:
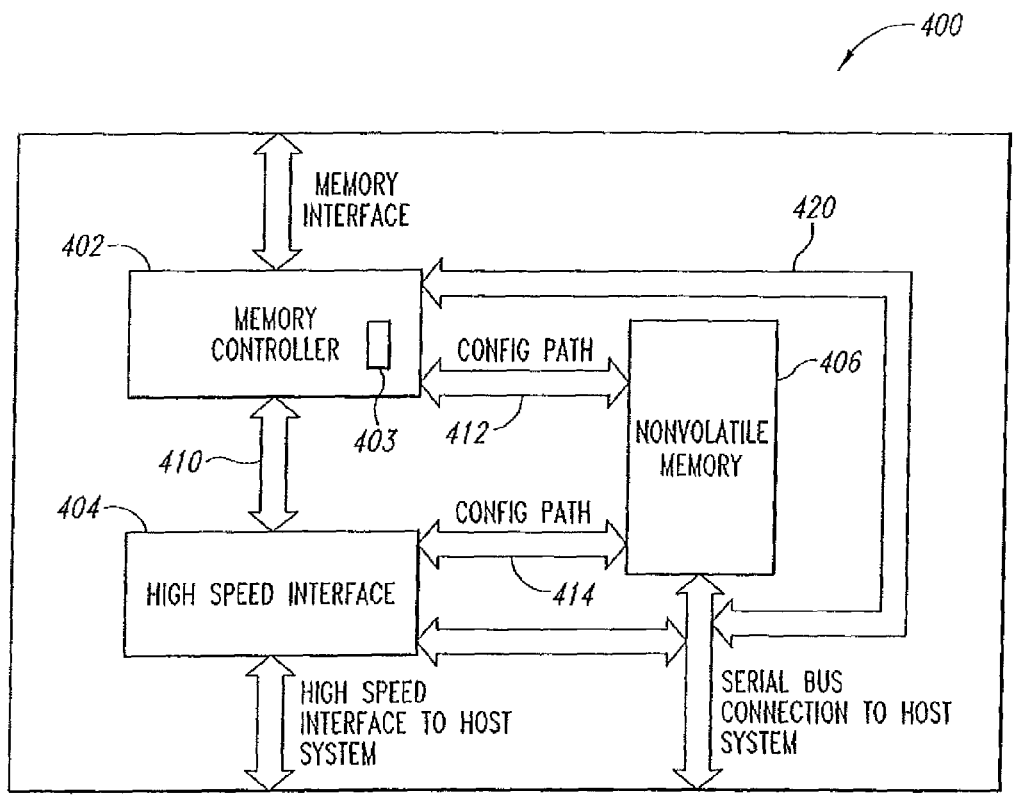
FIG. 4 is a partial block diagram of a memory hub for the memory module of FIG. 3.

FIG. 4 illustrates a partial block diagram of a memory hub 400 according to an embodiment of the present invention. The memory hub 400 can be substituted for the memory hub 140 (FIG. 3). The memory hub 400 includes a memory controller 402 coupled to a high-speed interface 404 through a memory hub bus 410. The high-speed interface 404 is coupled to the high-speed bus 134 in order for the memory controller 402 to communicate with the host system. The memory hub bus 410 can be implemented using conventional designs well known in the art. For example, the memory hub bus 410 can include a bus having bi-directional signal lines for receiving and transmitting signals between the memory controller 402 and the high-speed interface 404.

The high-speed interface 404 is conventional, and includes conventional circuitry used for transferring data, command, and address information through the high-speed bus 134. As well known, such circuitry includes transmitter and receiver logic known in the art. It will be appreciated that those ordinarily skilled in the art have sufficient understanding to modify the high-speed interface 404 to be used with specific types of communication paths, and that such modifications to the high-speed interface 404 can be made without departing from the scope of the present invention. For example, in the event the high-speed bus 134 to which the high-speed interface 404 is coupled is implemented using an optical communications path, the high-speed interface 404 will include an optical input/output port that can convert optical signals into electrical signals for operation of the memory hub 400.

The memory controller 402 is coupled to the memory device bus 150 (FIG. 3). The memory controller 402 performs the same functions as a conventional memory controller by providing control and address signals to the memory devices 240a-240i coupled to the memory device bus 150, and provides data signals to and receives data signals from the memory devices 240a-240i as well. However, the nature of the signals sent and received by the memory controller 402 will correspond to the nature of the signals that the memory devices 240a-240i coupled to the memory device bus 150 are adapted to send and receive. That is, the memory controller 402 is specially adapted to the memory devices 240a-240i to which the memory controller 402 is coupled. More specifically, the memory controller 402 is specially adapted to provide and receive the specific signals received and generated, respectively, by the memory device 240a-240i to which it is coupled. In an alternative embodiment, the memory controller 402 is capable of operating with memory devices 240a-240i operating at different clock frequencies. As a result, the memory controller 402 can isolate the processor 104 from changes that may occur at the interface between the memory hub 400 and memory devices 240a-240i coupled to the memory device bus 150, and consequently, provide a more controlled environment to which the memory devices 240a-240i may interface.

Configuration registers 403 are included in the memory controller 402. As will be explained in more detail below, the configuration registers 403 are typically loaded with module specific information upon power up. The module specific information can then be used by the memory controller 402 for initialization so that it can communicate most effectively with the memory devices of the memory module on which the memory hub 400 is located.

The memory hub 400 also includes a non-volatile memory 406 coupled to the memory controller 402 through a first configuration path 412 and further coupled to the high-speed interface 404 through a second configuration path 414. As will be explained in more detail below, the non-volatile memory 406 is used to store module specific information that is used by the memory controller 402 during initialization. The non-volatile memory 406 can be implemented using conventional non-volatile memory, such as FLASH memory or other types of electrically erasable programmable read-only memory (EEPROM). The non-volatile memory 406 is preferably embedded memory formed as part of the memory hub 400, and can be of a relatively small capacity, such as 256 Kbits or 512 Kbits. However, other types of non-volatile memory, and different capacities can be used as well without departing from the scope of the present invention.

The memory controller 402, high-speed interface 404, and non-volatile memory 406 are also coupled to a local system serial bus 420. The local system serial bus 420 can be coupled to a host system through a system serial bus, such as the system serial bus 136 shown in FIGS. 1 and 2. The non-volatile memory 406 is used to store information specific to the memory module on which the memory hub 400 is located. Examples of the module specific information includes timing information for the memory devices of the memory module, memory module configuration data, memory device type, manufacturer data, and the like.

As previously mentioned, in conventional memory modules, the module specific information is typically accessed by a host system upon start-up to properly initialize the host memory controller so that it can communicate most effectively with the memory devices of the memory module. In contrast, however, the non-volatile memory 406 is integrated with the memory hub 400 so that the module specific information can be accessed and copied directly from the non-volatile memory 406 to appropriate configuration registers 403 in the memory controller 402 when the host system is powered on. In embodiments having the non-volatile memory 406 integrated with the memory hub 400, and having the module specific information copied directly to the configuration registers 403, initialization time when powering on a host system can be reduced. Moreover, having the module specific information copied directly to the configuration registers 403 of the memory hub 400 allows for a host system to interface with the memory module without the need for the host system to accommodate any specific characteristics of the memory module or the memory devices on the memory module. Thus, the host system can interact with a system memory generically, relying on the memory hub 400 to manage the specifics of the memory module.

The non-volatile memory 406 can also store module specific information used by a host system as well, such as memory module capacity, memory module clock speed, and the like. Such information is often used by the basic input/output system (BIOS), the operating system, or application software in performing various tasks. For module specific information that should be provided to the host system in which the memory module is located, the information can be provided through the high-speed interface 404 to the host system via the configuration path 414 and the high-speed bus 134. Alternatively, in embodiments of the present invention having the local system serial bus 420, the module specific information can be provided though a system serial bus that is coupled to the local system serial bus 420.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of initializing a memory sub-system, comprising:
    accessing a non-volatile memory that contains configuration information specific to the memory sub-system on which the non-volatile memory is located, the configuration information being stored in the non-volatile memory before initialization, the non-volatile memory accessed through a first configuration path from a memory controller of the memory sub-system to the non-volatile memory;
    loading a configuration register included in the memory controller with the configuration information from the non-volatile memory through the first configuration path, wherein the configuration information is specific to the memory sub-system;
    receiving memory access requests from a host system through a link interface coupled to the memory controller; and
    providing the host system access to the non-volatile memory through a second configuration path coupled to the link interface and the non-volatile memory.

2. The method of claim 1, further comprising providing the configuration information from the non-volatile memory to a register of the memory controller to which the non-volatile memory is coupled.

3. The method of claim 2 wherein providing the configuration information to the register of the memory controller comprises coupling the configuration information to a serial bus to which the memory controller is coupled.

4. The method of claim 2 wherein providing the configuration information to the register of the system memory controller comprises providing memory capacity, memory clock speed, or combinations thereof.

5. The method of claim 1 wherein accessing the non-volatile memory comprises accessing an electrically erasable programmable read-only memory.

6. The method of claim 1 wherein accessing the non-volatile memory comprises accessing an embedded non-volatile memory.

7. The method of claim 1 wherein loading the configuration register with the configuration information comprises loading timing information, memory configuration data, memory type, manufacturer data, or combinations thereof.

8. A method of initializing a memory sub-system, comprising:
    accessing a non-volatile memory that contains configuration information specific to the memory sub-system on which the non-volatile memory is located, the configuration information being stored in the non-volatile memory before initialization, the non-volatile memory accessed through a first configuration path from a memory controller of the memory sub-system to the non-volatile memory;
    loading at least one configuration register included in the memory controller with at least a portion of the configuration information specific to at least a portion of memory of the memory sub-system through the first configuration path;
    providing a host system access to the non-volatile memory, the non-volatile memory accessed by the host system through a second configuration path coupled to the memory controller and the non-volatile memory, the second configuration path comprising a link interface;
    receiving, at the memory controller, at least one memory access request from the host system through the link interface; and
    accessing, at the memory controller, in response to the at least one memory access request and in accordance with the at least a portion of the configuration information, at least a portion of memory of the memory sub-system.

9. The method of claim 8, further comprising providing the configuration information from the non-volatile memory to a register of the memory controller to which the non-volatile memory to a register of the memory controller to which the non-volatile memory is coupled.

10. The method of claim 9 wherein providing the configuration information to the register to the register of the memory controller comprises coupling the configuration information to a serial bus to which the memory controller is coupled.

11. The method of claim 9 wherein providing the configuration information to the register of the system memory controller comprises providing memory capacity, memory clock speed, or combination thereof.

12. The method of claim 8 wherein accessing the non-volatile memory comprises accessing an electronically erasable programmable read-only memory.

13. The method of claim 8 wherein accessing the nonvolatile memory comprises accessing an embedded nonvolatile memory.

14. The method of claim 8 wherein loading the configuration register with the configuration information comprises loading timing information, memory configuration data, memory type, manufacturer data, or combinations thereof.

* * * * *

UNITED STATES PATENT AND TRADEMARK OFFICE
CERTIFICATE OF CORRECTION

PATENT NO. : 8,832,404 B2  
APPLICATION NO. : 13/175158  
DATED : September 9, 2014  
INVENTOR(S) : Randy L. Schnepper Page 1 of 1

It is certified that error appears in the above-identified patent and that said Letters Patent is hereby corrected as shown below:

On the title page of the patent (63) Continuation of application No. "12/631,388" should read ---12/361,388--.

Signed and Sealed this  
Ninth Day of August, 2016

Michelle K. Lee  
*Director of the United States Patent and Trademark Office*